US011425764B2

(12) United States Patent
Wang et al.

(10) Patent No.: US 11,425,764 B2
(45) Date of Patent: Aug. 23, 2022

(54) COMMUNICATION METHOD AND COMMUNICATIONS APPARATUS FOR REPORTING ESTABLISHMENT CAUSES

(71) Applicant: Huawei Technologies Co., Ltd., Shenzhen (CN)

(72) Inventors: Rui Wang, Shanghai (CN); Qinghai Zeng, Shanghai (CN); Jinyao Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/094,266

(22) Filed: Nov. 10, 2020

(65) Prior Publication Data
US 2021/0058986 A1    Feb. 25, 2021

Related U.S. Application Data

(63) Continuation of application No. PCT/CN2019/086208, filed on May 9, 2019.

(30) Foreign Application Priority Data

May 11, 2018  (CN) .......................... 201810451436.0

(51) Int. Cl.
*H04W 76/10* (2018.01)
*H04W 88/06* (2009.01)
*H04W 88/10* (2009.01)

(52) U.S. Cl.
CPC ............ *H04W 76/10* (2018.02); *H04W 88/06* (2013.01); *H04W 88/10* (2013.01)

(58) Field of Classification Search
CPC ..... H04W 4/00; H04W 48/02; H04W 48/116; H04W 16/28; H04W 76/27;
(Continued)

(56) References Cited

U.S. PATENT DOCUMENTS 9,866,682 B2 *  1/2018  Xing .................... H04M 3/2227
10,790,879 B2 *  9/2020  Zhao ....................... H04L 69/18
(Continued)

FOREIGN PATENT DOCUMENTS

CN    107969015 A    4/2018
JP    2019512927 A    5/2019
(Continued)

OTHER PUBLICATIONS

Ericsson, "Establishment causes for NR" Mar. 2018 (Year: 2018).*
(Continued)

*Primary Examiner* — William D Cumming
(74) *Attorney, Agent, or Firm* — Conley Rose, P.C.

(57) ABSTRACT

A communication method and a communications apparatus, where the method includes: first determining, by a terminal, a first radio access technology for establishing a Radio Resource Control (RRC) connection; and then determining, by the terminal based on access information, a first cause value for establishing the RRC connection, where the first cause value is a cause value of the first radio access technology, and the access information includes at least one of an access identity (AI), an access category (AC), or a second cause value of a second radio access technology. After the terminal determines the first cause value, the terminal sends a first message used to establish the RRC connection, and uses the first message to carry the first cause value.

22 Claims, 10 Drawing Sheets

(58) Field of Classification Search
CPC . H04W 74/0833; H04W 16/32; H04W 80/08; H04W 24/20; H04W 76/10
USPC .......................................................... 455/449
See application file for complete search history.

(56) References Cited

U.S. PATENT DOCUMENTS

| | | | |
|---|---|---|---|
| 11,166,176 B2* | 11/2021 | Liang | H04W 76/27 |
| 2013/0237267 A1 | 9/2013 | Lee et al. | |
| 2016/0182711 A1* | 6/2016 | Xing | H04W 16/32 |
| | | | 455/449 |
| 2018/0054760 A1* | 2/2018 | Chun | H04W 4/00 |
| 2019/0068246 A1* | 2/2019 | Zhao | H04B 5/00 |
| 2019/0110243 A1 | 4/2019 | Chun et al. | |
| 2019/0357076 A1* | 11/2019 | Han | H04W 80/08 |
| 2020/0100123 A1* | 3/2020 | Liang | H04W 24/02 |
| 2020/0266960 A1* | 8/2020 | Jiang | H04W 24/10 |
| 2021/0007041 A1 | 1/2021 | Wallentin et al. | |
| 2021/0058986 A1* | 2/2021 | Wang | H04W 76/10 |

FOREIGN PATENT DOCUMENTS

| | | | |
|---|---|---|---|
| JP | 2021510976 A | 4/2021 | |
| WO | 2017171427 A1 | 10/2017 | |
| WO | 2019142104 A1 | 7/2019 | |
| WO | WO-2019142104 A1 * | 7/2019 | ........ H04W 74/0833 |
| WO | WO-2021092585 A1 * | 5/2021 | |

OTHER PUBLICATIONS

Gorry Fairhurst, Protocol Layers Jan. 2001 (Year: 2001).*
Wang Zhi and Luo Siqi, "Improved scheme of RRC message transmission in LTE system," 2010 International Conference on Educational and Information Technology, Oct. 2010, pp. V3-345-V3-348, doi: 10.1109/ICEIT.2010.5608357. (Year: 2010).*
F. A. C. M. Cardoso, F. A. P. Figueiredo, R. Vilela and J. P. Miranda, "A case study on protocol stack integration for 3GPP LTE evolved node B," 2014 IEEE Latin-America Conference on Communications (LATINCOM), Nov. 2014, pp. 1-6, doi: 10.1109/LATINCOM.2014.7041860. (Year: 2014).*
Huawei, et al., "Access Control for UE accessing 5GC via LTE," 3GPP TSG-RAN WG2 Meeting #99,R2-1708397, Berlin, Germany, Aug. 21-25, 2017, 3 pages.
SA WG2 Meeting #127,S2-184285, "Missing redirection to E-UTRA connected to 5GC," SA WG2, Apr. 16-20, 2018, Sanya, P R. China, 3 pages.
Ericsson, "Establishment causes for NR," 3GPP TSG-RAN WG2 #99bis, Prague, Czech Republic, Oct. 9-13, 2017, R2-1710480, 5 pages.
Ericsson, "Establishment causes for NR," 3GPP TSG-RAN WG2 #100, Reno, Nevada, USA, Nov. 27-Dec. 1, 2017, R2-1712533, 5 pages.
Ericsson, "Establishment causes for NR," 3GPP TSG-RAN WG2 NR AH#3, Vancouver, Canada, Jan. 22-26, 2018, R2-1800321, 7 pages.
3GPP TS 22.261 V16.3.0 "3rd Generation Partnership Project; Technical Specification Group Services and System Aspects; Service requirements for the 5G system; Stage 1 (Release 16)," Mar. 2018, 54 pages.
Huawei, et al., "Further Discussion on Slice Information over RRC," 3GPP TSG-RAN WG2 Meeting#101bis, Sanya, China, Apr. 16-20, 2018, R2-1804616, 3 pages.
3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification(Release 15)," Mar. 2018, 786 pages.
Ericsson, "Establishment causes for NR," 3GPP TSG-RAN WG2#101, Athens, Greece, Feb. 26-Mar. 2, 2018, R2-1802354, 8 pages.
Huawei, et al., "RRC Establishment Cause," 3GPP TSG-RAN WG2 Meeting #101 bis, Sanya, China, Apr. 16-20, 2018, R2-1805300, 3 pages.
3GPP TS 24.501 V1.1.1, "3rd Generation Partnership Project; Technical Specification Group Core Network and Terminals; Non-Access-Stratum (NAS) protocol for 5G System (5GS); Stage 3 (Release 15)," May 2018, 297 pages.
Vivo, et al., "RRC establishment cause," 3GPP TSG-CT WG1 Meeting #110, Kunming (P.R. of China), Apr. 16-20, 2018, C1-182847, 8 pages.

* cited by examiner

COMMUNICATION METHOD AND COMMUNICATIONS APPARATUS FOR REPORTING ESTABLISHMENT CAUSES

CROSS-REFERENCE TO RELATED APPLICATIONS

This application is a continuation of International Patent Application No. PCT/CN2019/086208, filed on May 9, 2019, which claims priority to Chinese Patent Application No. 201810451436.0, filed on May 11, 2018. The disclosures of the aforementioned applications are hereby incorporated by reference in their entireties.

TECHNICAL FIELD

This application relates to communications technologies, and in particular, to a communication method and a communications apparatus.

BACKGROUND

With evolution of wireless communications technologies, a future radio network system may include a plurality of radio access technologies, for example, one or more of a 2nd generation (2G) wireless communications technology, a 3rd generation (3G) wireless communications technology, a 4th generation (4G) wireless communications technology, a 5th generation (5G) wireless communications technology, and a radio access technology that further evolves in the future. In addition, the future radio network system may further include a radio access technology that is not defined by the 3rd Generation Partnership Project (3GPP) organization, for example, a wireless local area network (WLAN), Bluetooth, or a short-range communications technology. In addition, a radio access network device that supports one or more radio access technologies may be connected to a plurality of core networks that use different technologies. Types of the core networks may be a 2G core network, a 3G core network, an evolved packet core (EPC), a 5G core (5GC) network, a type of a core network that further evolves in the future, and the like. In addition, because service types are increasingly diversified, capabilities of a terminal and the radio access network device are increasingly strong. Therefore, when the terminal establishes a connection to the radio access network device, the terminal is expected to provide more connection establishment cause values for processing and network optimization by a radio access network.

When the radio access device provides, using one radio access technology for the terminal, services of a plurality of core networks using different technologies, cause values corresponding to wireless communications systems to which the plurality of core networks belong need to be carried in a message format defined by a same radio access technology. Therefore, a method for processing a cause value needs to be provided, such that when the terminal accesses different core networks using a same radio access technology, the terminal can successfully report the cause value.

SUMMARY

This application provides a communication method and a communications apparatus, such that when a terminal accesses different core networks using one radio access technology, the terminal can successfully report a cause value.

A first aspect of this application provides a communication method. The method includes the following.

A terminal first determines a first radio access technology for establishing a Radio Resource Control (RRC) connection; and then the terminal determines, based on access information, a first cause value for establishing the RRC connection, where the first cause value is a cause value of the first radio access technology, and the access information includes at least one of an access identity (AI), an access category (AC), or a second cause value of a second radio access technology. After the terminal determines the first cause value, the terminal sends a first message used to establish the RRC connection, and uses the first message to carry the first cause value.

In the method, the terminal may determine the first cause value based on the access information including at least one of the AI, the AC, or the second cause value, where the first cause value is the cause value of the first radio access technology, and the second cause value is a cause value of the second radio access technology. Therefore, when a radio access device provides, using one radio access technology for the terminal, services of a plurality of core networks using different technologies, cause values that are sent by the terminal to the radio access device and that are used for communication with different core networks may be carried in a message format defined by a same radio access technology. In this way, when the terminal accesses a plurality of core networks using one radio access technology, the terminal can successfully report a cause value. For example, when the terminal accesses an EPC through a next generation eNodeB (ng-eNB), a first cause value of Evolved Universal Mobile Telecommunications System (UMTS) Terrestrial Radio Access (E-UTRA) is used. When the terminal accesses a 5GC through the ng-eNB, a corresponding first radio access technology is E-UTRA, and a corresponding second radio access technology is New Radio (NR), the terminal may determine an E-UTRA cause value based on at least one of the AI, the AC, or an NR cause value. To be more specific, when accessing the 5GC, the terminal may also use the E-UTRA to report the cause value to the ng-eNB. This ensures that the terminal can successfully report the cause value when the terminal accesses the EPC and the 5GC through the ng-eNB.

In a possible design, the terminal may determine the first cause value based on a mapping relationship between the second cause value and the first cause value.

In a possible design, the terminal may determine the first cause value based on a mapping relationship between the AI and the first cause value.

In a possible design, the terminal may determine the first cause value based on a mapping relationship between the AC and the first cause value.

In a possible design, a first protocol layer of the terminal may determine the first cause value based on the access information.

In a possible design, a second protocol layer of the terminal may obtain the first cause value from the first protocol layer of the terminal, and the second protocol layer sends the first message including the first cause value.

In a possible design, a second protocol layer of the terminal may obtain the access information from a first protocol layer of the terminal, and the second protocol layer of the terminal determines the first cause value based on the access information.

In a possible design, the first radio access technology includes an E-UTRA technology, and the second radio access technology includes an NR technology.

In a possible design, the first protocol layer is a non-access stratum (NAS), and the second protocol layer is an RRC layer.

In a possible design, the establishing an RRC connection includes establishing a new RRC connection, resuming an RRC connection, or reestablishing an RRC connection.

In a possible design, the mapping relationship between the second cause value and the first cause value may be preconfigured in any one of the following manners.

NAS signaling message configuration, operation, administration and maintenance (OAM) configuration, operator preconfiguration, and default configuration.

In a possible design, the mapping relationship between the AI and the first cause value may be preconfigured in any one of the following manners.

NAS signaling message configuration, OAM configuration, operator preconfiguration, and default configuration.

In a possible design, the mapping relationship between the AC and the first cause value may be preconfigured in any one of the following manners.

NAS signaling message configuration, OAM configuration, operator preconfiguration, and default configuration.

A second aspect of this application provides a communications apparatus. The communications apparatus includes a processor, where the processor is configured to be coupled to a memory, and read and execute instructions in the memory, to implement the method in the first aspect. Optionally, the communications apparatus may further include a transceiver configured to support the communications apparatus in sending and receiving data, signaling, or information in the method in the first aspect, for example, sending the first message. Optionally, the communications apparatus may be a terminal device, or may be some apparatuses in a terminal device, for example, a chip system in a terminal device. Optionally, the chip system is configured to support a terminal device in implementing the functions in the foregoing aspect, for example, generating, receiving, sending, or processing the data and/or the information in the foregoing method. In a possible design, the chip system further includes a memory. The memory is configured to store a program instruction and data that are necessary for the terminal device. The chip system includes a chip, and may further include another discrete device or circuit structure.

A third aspect of this application provides a communications apparatus. The communications apparatus has functions of implementing the first aspect. The functions may be implemented by hardware, or may be implemented by hardware executing corresponding software. The hardware or the software includes one or more modules corresponding to the foregoing functions.

In a possible design, the communications apparatus may include a processing module and a sending module. The processing module and the sending module may perform corresponding functions in the foregoing method. For example, the processing module is configured to determine a first radio access technology for establishing an RRC connection, and determine, based on access information, a first cause value for establishing the RRC connection, where the access information includes at least one of an AI, an AC, or a second cause value of a second radio access technology; and the sending module is configured to send a first message, where the first message is used to request to establish the RRC connection, and the first message includes the first cause value.

A fourth aspect of this application provides a readable storage medium. The storage medium stores a computer program, and the computer program includes instructions used to perform the method according to the first aspect.

A fifth aspect of this application provides a computer program product. The computer program product includes computer program code, and when the computer program code is executed, a computer is enabled to perform the method according to the first aspect.

It should be noted that some or all of the computer program code can be stored in a first storage medium. The first storage medium can be encapsulated with a processor, or encapsulated separately from a processor. This is not specifically limited in this embodiment of this application.

DESCRIPTION OF EMBODIMENTS

First, it should be understood that, "at least one" described in the embodiments of this application represents "one" or "one or more". For example, "include at least one of A, B, or C" may indicate the following meanings:

(1) including A (2) including B (3) including C (4) including A and B (5) including A and C (6) including B and C (7) including A, B, and C.

In an evolution process of wireless communications access technologies, various radio access technologies continuously emerge, such as 2G, 3G, 4G, and 5G. 4G and 5G are used as examples. A 4G wireless communications system performs communication based on an Evolved Universal Mobile Telecommunications System (UMTS) Terrestrial Radio Access (E-UTRA) technology, and a 5G wireless communications system (5G System (5GS)) performs communication based on an (NR technology. A terminal may be connected to a radio access network device using one or more radio access technologies. For example, different terminals may separately access a 5G core network using the NR technology and the E-UTRA technology. Therefore, NAS layers used by the different terminals are all 5GS NASs, and RRC layers used by the different terminals are corresponding NR RRC layers or E-UTRA RRC layers.

The technical solutions provided in this application may be applied to the foregoing radio access technologies and various radio access technologies other than the foregoing radio access technologies. For ease of description, the following embodiments of this application are described using the NR technology in the 5G system and the E-UTRA technology in the 4G system as examples. However, this application is not limited thereto.

Figure 1:
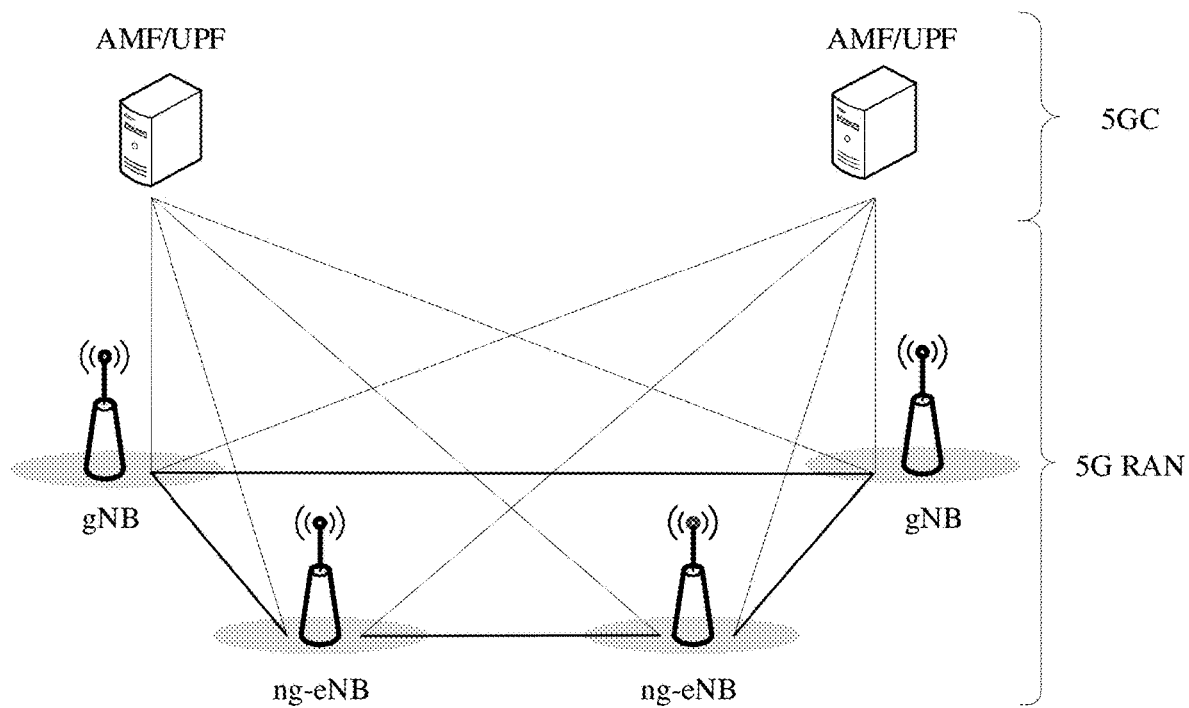
FIG. 1 is a system architectural diagram of a 5G wireless communications system.

FIG. 1 is a system architectural diagram of a 5G wireless communications system. As shown in FIG. 1, the 5G wireless communications system mainly includes a 5GC and a 5G radio access network (RAN) (also referred to as an NG-RAN). The 5GC is a core network of a 5GS, and may include an access and mobility management function (AMF), a user plane function (UPF), and another network element. The 5G RAN is a radio access network in the 5G wireless communications system. In the 5G RAN, there are two types of RAN nodes: a gNodeB (gNB) and an ng-eNB. The gNB provides termination points of a user plane protocol stack and a control plane protocol stack of NR for a terminal. The ng-eNB provides termination points of a user plane protocol stack and a control plane protocol stack of E-UTRA for the terminal. The ng-eNB may be connected to the 5GC, such that the terminal accesses the 5GC through the ng-eNB. In addition, the ng-eNB may be connected to a 4G EPC, such that the terminal accesses the EPC through the ng-eNB.

When the ng-eNB is connected to the 5GC, an ng-eNB E-UTRA technology provides a radio transmission resource for the terminal, and provides a 5GC service for the terminal.

Figure 2:
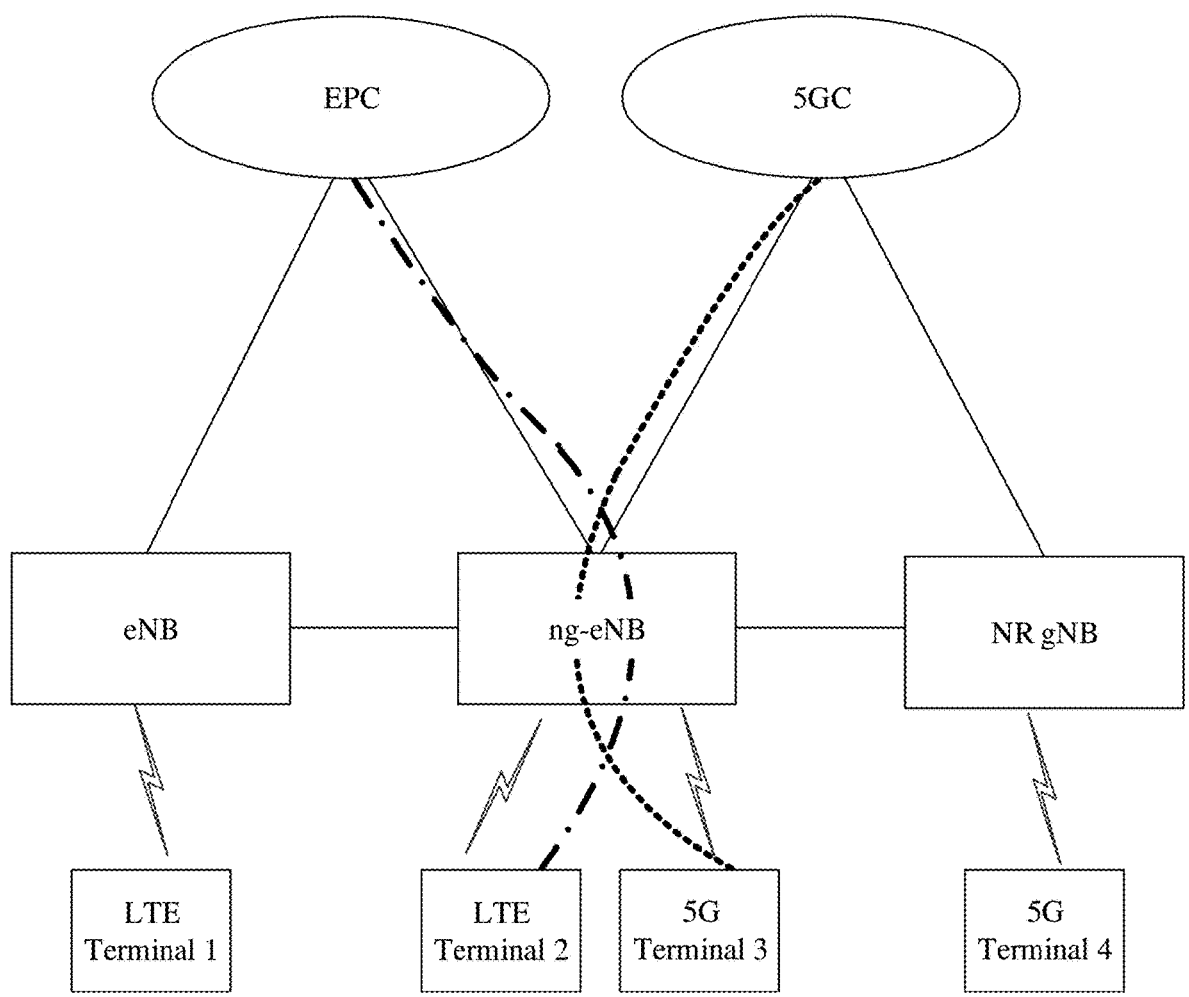
FIG. 2 is a schematic connection diagram showing that an ng-eNB is connected to both a 5GC and an EPC.

In actual deployment, the ng-eNB may be connected only to the 5GC or the EPC, or the ng-eNB may be connected to both the 5GC and the EPC. FIG. 2 is a schematic connection diagram showing that the ng-eNB is connected to both the 5GC and the EPC. As shown in FIG. 2, the ng-eNB is connected to both the 5GC and the EPC. In addition, the terminal can access the EPC through a traditional eNB and access the 5GC through the gNB. For example, both the ng-eNB and the gNB are connected to the 5GC, and the terminal may access the 5GC through the ng-eNB or the gNB. The ng-eNB and the gNB may be connected to each other, to implement communication between base stations and exchange information related to the terminal. In addition, when there is still a traditional eNB in a network, the ng-eNB and the eNB are connected to each other, to implement communication between base stations and exchange the information related to the terminal. A traditional Long-Term Evolution (LTE) terminal may access the EPC through the eNB or the ng-eNB.

It can be learned from the foregoing that a terminal may access the 5GC through the gNB, or may access the 5GC through the ng-eNB. The ng-eNB may be connected to both the 5GC and the EPC.

Figure 3:
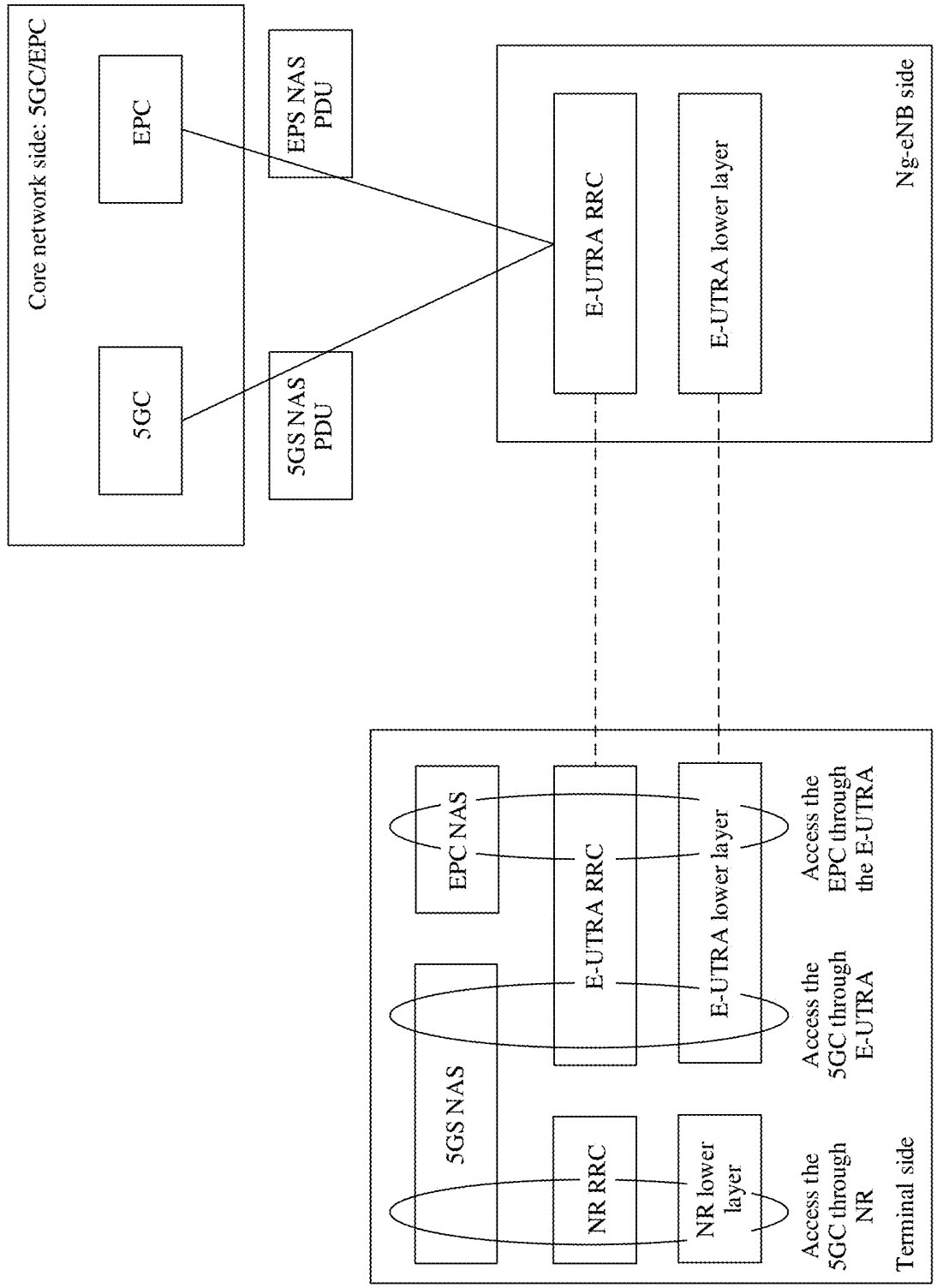
FIG. 3 is an architectural diagram of a protocol stack of a terminal that supports two radio access technologies and a connection between the terminal and an ng-eNB.

FIG. 3 is an architectural diagram of a protocol stack of a terminal that supports two radio access technologies and a connection between the terminal and an ng-eNB. As shown in FIG. 3, the terminal supports both an NR technology and an E-UTRA technology, that is, the terminal can access both a 5GC and an EPC. It is assumed that the terminal supports access to the 5GC through both a gNB and the ng-eNB. In this case, as shown in FIG. 3, the terminal supports an NR air interface protocol stack, including, for example, an NR RRC protocol layer, an NR lower protocol layer (for example, a Radio Link Control (RLC) layer, a Media Access Control (MAC) layer, and a physical (PHY) layer), and a non-access stratum (NAS) defined for the 5GS, which is referred to as a 5GS NAS protocol layer for short. In addition, the terminal further supports an E-UTRA air interface protocol stack, including, for example, an E-UTRA RRC protocol layer, an E-UTRA lower protocol layer, and the 5GS NAS protocol layer. In addition, it is assumed that the terminal supports access to the EPC through the ng-eNB or an eNB, such that the terminal further needs to support an NAS protocol layer defined for the Evolved Packet System (EPS), which is referred to as an EPS NAS for short. If the terminal supports one access manner, the terminal needs to support a corresponding protocol stack inside. That is, if the terminal has a capability of accessing the 5GC through E-UTRA, the terminal needs to have at least the 5GS NAS protocol layer and the E-UTRA RRC protocol layer. If the terminal has a capability of accessing the 5GC through NR, the terminal needs to have at least the 5GS NAS protocol layer and the NR RRC protocol layer. If the terminal has a capability of accessing the EPC through the E-UTRA, the terminal needs to have at least the EPS NAS protocol layer and the E-UTRA RRC protocol layer. It should be noted that, in FIG. 3, only the terminal that supports two radio access technologies is used as an example. However, this embodiment of this application is also applicable to a terminal that supports one radio access technology. For example, when the terminal does not have the NR RRC protocol layer and the NR lower layer shown in FIG. 3, the technical solutions in this embodiment of this application may also be applied. In addition, when the terminal does not have the EPS NAS shown in FIG. 3, the technical solutions in this embodiment of this application may also be applied.

It should be noted that the technical solutions in this application are mainly for a scenario in which the terminal accesses the 5GC through the ng-eNB. However, to help a person skilled in the art better understand the technical solutions in this application, a process in which the terminal accesses the 5GC through the gNB is also described in the following embodiments of this application.

Before sending signaling or data to a core network (for example, the 5GC or the EPC), an existing terminal first needs to send an RRC request to a base station (for example, a gNB or an ng-eNB), to establish an RRC connection. When sending the RRC request, the terminal uses the RRC request to carry a cause value to identify a cause of current access of the terminal. The RRC request may be used to request to establish a new RRC connection or resume an RRC connection. The resuming an RRC connection may be: when UE switches from a third state (or referred to as an inactive state) to a connected state, resuming a suspended RRC connection to an RRC connection that can be used for normal communication. Correspondingly, an RRC message may be an RRC Connection Request, an RRC Setup Request, an RRC Resume Request, an RRC Connection Resume Request, or the like.

In other approaches, as specified in an LTE-related protocol, a cause value in an RRC request occupies three bits in total, and may carry a maximum of eight values. A current protocol specifies seven cause values (it is not excluded that more than seven cause values, for example, eight cause values, are defined in future evolution of an LTE system). They are an emergency, high priority access, mobile terminating access (mt-Access), mobile originating (MO) signaling (mo-Signaling), mobile originating data (mo-Data), delay tolerant access, and a mobile originating voice call (mo-Voice Call).

However, for the 5GS, for reasons such as a higher requirement of the 5GS on a service such as a video service, a quantity of cause values that may be carried by the terminal in the RRC request may be greater than seven specified in an EPS system, for example, may be eight or more than eight. If a relatively large quantity of cause values are specified in the 5GS, more fields need to be occupied in the RRC request to carry the cause values.

Referring to the schematic diagram of the protocol stack in FIG. 3, in other approaches, the cause value in the RRC request sent when the terminal accesses the 5GC is generated by the 5GS NAS, and then sent by a lower-layer protocol stack via the RRC message. If the terminal accesses the 5GC through the gNB, the terminal sends an RRC request to the gNB. In a possible case, because the gNB provides a radio transmission resource for the terminal using the NR technology, and as new radio, the NR may define a new RRC message format, more fields than those in the EPS may be directly used to carry the cause values.

However, if the terminal accesses the 5GC through the ng-eNB, the terminal needs to send an RRC request to the ng-eNB. As described above, the ng-eNB provides a radio transmission resource for the terminal using the E-UTRA technology. Therefore, a length of fields occupied by the cause value in the RRC request needs to comply with a specification in an E-UTRA protocol, that is, a quantity of cause values is 7 (at most 8). In this case, if the terminal does not perform corresponding processing on the cause value before sending the RRC request to the ng-eNB, an exception occurs when the cause value is sent.

The technical solutions described in this application are intended to resolve the foregoing problem.

It should be noted that the terminal described in the following embodiments of this application is any terminal that can access the 5GC through the ng-eNB. It should be understood that, in the embodiments of this application, the terminal may include but is not limited to a terminal device applied to an internet of things, for example, may be a terminal device that accesses a Narrowband Internet of Things (NB-IoT), which may be referred to as an "NB-IoT terminal": a smart meter reading device, a logistics tracking device, an environment monitoring device, or the like. The terminal may further include but is not limited to a mobile station (MS), a mobile terminal, a mobile telephone, a user equipment (UE), a handset, portable equipment, and the like. The terminal device may communicate with one or more core networks through a radio access network (RAN). For example, the terminal device may be a mobile phone (or referred to as a "cellular" phone) or a computer having a wireless communication function. Alternatively, the terminal device may be a portable, pocket-sized, handheld, computer built-in, or vehicle-mounted mobile device.

Figure 4:
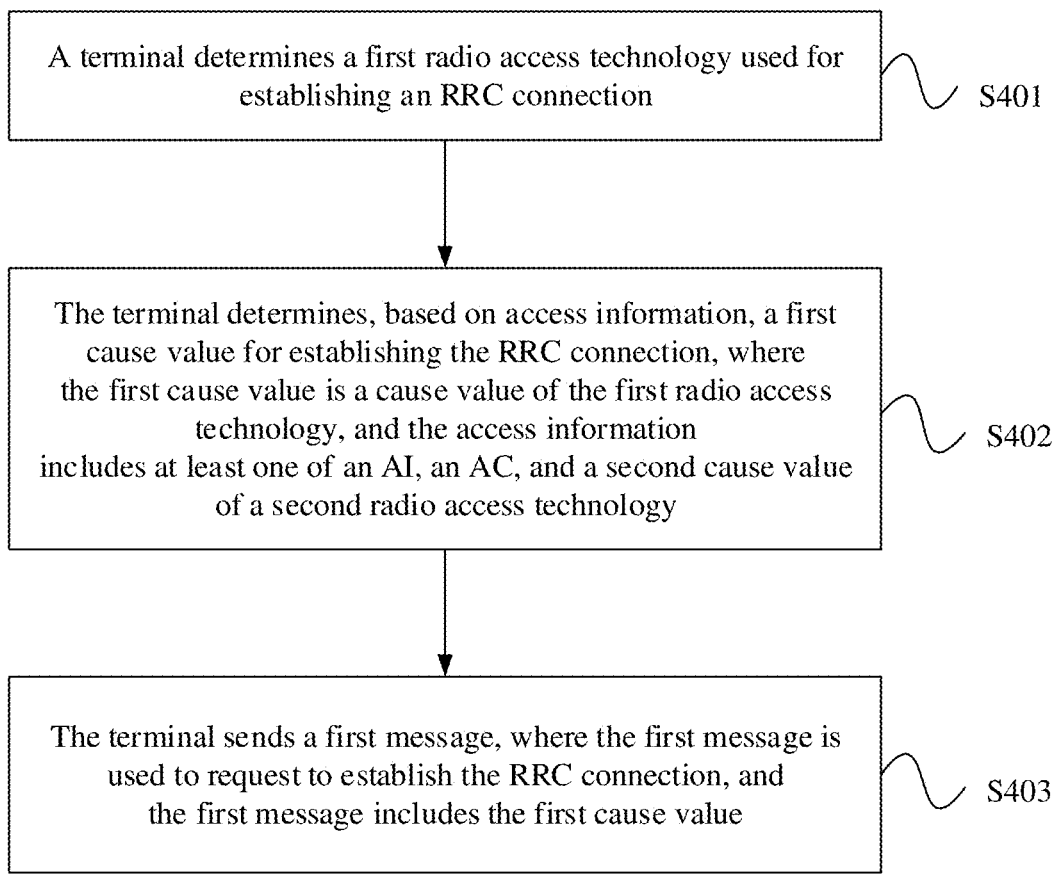
FIG. 4 is a schematic flowchart of Embodiment 1 of a communication method according to this application.

FIG. 4 is a schematic flowchart of Embodiment 1 of a communication method according to this application. As shown in FIG. 4, the method includes the following steps.

S401: Optionally, a terminal determines a first radio access technology for establishing an RRC connection.

Optionally, a first protocol layer of the terminal may obtain, from a second protocol layer, the first radio access technology for establishing the RRC connection.

Optionally, the first protocol layer may be an NAS, and the second protocol layer may be an RRC layer.

For example, the first protocol layer may be the 5GS NAS shown in FIG. 3, and the second protocol layer may be the E-UTRA RRC shown in FIG. 3.

For ease of description, the following embodiment of this application is described using an example in which the first protocol layer is the 5GS NAS and the second protocol layer is the E-UTRARRC. However, it should be noted that this application is not limited thereto, and the first protocol layer and the second protocol layer may alternatively be protocol layers of another wireless communications system or access technology.

Optionally, the first radio access technology may be E-UTRA.

S402: The terminal determines, based on access information, a first cause value for establishing the RRC connection, where the first cause value is a cause value of the first radio access technology, and the access information includes at least one of an access identity (AI), an access category (AC), or a second cause value of a second radio access technology.

That the access information includes at least one of an AI, an AC, or a second cause value of a second radio access technology includes the following several cases.

(1) The access information includes the AI.
(2) The access information includes the AC.
(3) The access information includes the second cause value.
(4) The access information includes the AI and the AC.
(5) The access information includes the AI and the second cause value.
(6) The access information includes the AC and the second cause value.
(7) The access information includes the AI, the AC, and the second cause value.

Optionally, a process of obtaining the AI and the AC may be as follows.

The 5GS NAS detects in real time whether an access attempt triggered by one of the following events occurs.

(1) An event that requires the terminal to switch from a 5G mobility management (MM) idle state (5G MM-IDLE) to a 5G MM connected state (5G MM-CONNECTED).

(2) The following events that occur when the terminal is in the 5G MM connected state or in the 5G MM connected state (with an RRC third state indication).

A. The 5G MM receives an MO-Multimedia Telephony (MMTEL)-voice-call-started indication, an MO-MMTEL-video-call-started indication, an MO-short message service (SMS) over Internet Protocol (SMSoIP)-attempt-started indication, or the like from an upper layer.

B. The 5G MM receives, from the upper layer, an SMS over NAS request initiated by the terminal and the like (except a case in which a UE needs to switch from the 5G MM idle state to the 5G MM connected state in a service request procedure triggered by the request).

C. The 5G MM receives, from the upper layer, an uplink (UL) NAS TRANSPORT message for establishing a protocol data unit (PDU) session (except the case in which the UE needs to switch from the 5G MM idle state to the 5G MM connected state in the service request procedure triggered by the request).

D. The 5G MM receives, from the upper layer, an UL NAS TRANSPORT message for modifying the PDU session (except the case in which the UE needs to switch from the 5G MM idle state to the 5G MM connected state in the service request procedure triggered by the request).

E. The 5G MM receives, from the upper layer, a request of a user plane resource used to reestablish an existing PDU session.

When detecting that one of the foregoing events occurs, the 5GS NAS obtains at least one AI and one AC based on a preset mapping relationship.

The preset mapping relationship may be a mapping relationship specified in a protocol.

AIs may be distinguished by AI identifiers or index values. For example, an AI 0 and an AI 1 separately identify s with specific meanings. Correspondingly, ACs may also be distinguished by AC identifiers or index values. For example, an AC 0 and an AC 1 separately identify ACs with specific meanings.

For example, if a multimedia priority service (MPS) is configured for the terminal, the 5GS NAS is mapped to the AI 1. If a mission critical service (MCS) is configured for the terminal, the 5GS NAS is mapped to an AI 2.

For example, if a type of the access attempt is a response to paging, the 5GS NAS is mapped to the AC 0. If the type of the access attempt is an emergency call, the 5GS NAS is mapped to an AC 2.

Optionally, a process of obtaining the second cause value is as follows.

The 5GS NAS determines the second cause value based on at least one of the AI, the AC, or the type of the access attempt.

The type of the access attempt is used to identify a call type. For example, the type of the access attempt may be the emergency call, the response to paging, a video call initiated by the terminal, or the like.

The second cause value is a setup cause value of the second radio access technology. Optionally, the second radio access technology may be NR.

For example, the 5GS NAS obtains the second cause value based on the following Table 1. Values of the AI include the AI 0, the AI 1, ..., and an AI X, values of the AC include the AC 0, the AC 1, ..., and an AC Y, and the second cause value (namely, an RRC setup cause value in the table) includes N different values. X is an integer greater than 0, Y is an integer greater than 0, and N is an integer greater than 0.

TABLE 1

| AI | AC | RRC setup cause value |
|---|---|---|
| AI 0 | AC 0 | One of the N second cause values |
|  | AC 1 | One of the N second cause values |
|  | ... | One of the N second cause values |
|  | AC Y | One of the N second cause values |
| AI 1 | AC 0 | One of the N second cause values |
|  | AC 1 | One of the N second cause values |
|  | ... | One of the N second cause values |
|  | AC Y | One of the N second cause values |
| ... | AC 0 | One of the N second cause values |
|  | AC 1 | One of the N second cause values |
|  | ... | One of the N second cause values |
|  | AC Y | One of the N second cause values |
| AI X | AC 0 | One of the N second cause values |
|  | AC 1 | One of the N second cause values |
|  | ... | One of the N second cause values |
|  | AC Y | One of the N second cause values |

Further, after obtaining the AI, the AC, and the second cause value, the terminal may determine the first cause value based on at least one of the AI, the AC, or the second cause value.

Optionally, the terminal may determine the first cause value in the following three manners.

(1) The terminal determines the first cause value based on a mapping relationship between the second cause value and the first cause value.

For example, the mapping relationship between the second cause value and the first cause value may be represented in a form defined in the following Table 2. The first cause value includes M different values, where M is an integer greater than 0, and M is less than N.

TABLE 2

| Second cause value | First cause value |
|---|---|
| First value of the second cause value | One of the M first cause values |
| Second value of the second cause value | One of the M first cause values |
| ... | One of the M first cause values |
| $N^{th}$ value of the second cause value | One of the M first cause values |

Optionally, in a possible implementation, all the values of the first cause value are the same as the values of the second cause value, and there are N-M values that are in the second cause values but not in the first cause values. In this case, more than one different value in the second cause values corresponds to one same value in the first cause values. In this case, Table 2 may also include only mapping relationships between the N-M values that are in the second cause values but not in the first cause values and the values of the first cause value. For example, a $k^{th}$ value (where k is greater than or equal to 1 and less than or equal to N) of the second cause value is a cause value used to indicate a video service, and the first cause value does not include the value. In this case, Table 2 may indicate to map the $k^{th}$ value of the second cause value to an $L^{th}$ value (for example, a cause value indicating a voice service, which may be a cause value of a voice call initiated by the terminal) of the first cause value. Refer to the following Table 2-1.

TABLE 2-1

| Second cause value (N-M values in total) | First cause value |
|---|---|
| $k^{th}$ value of the second cause value | One of the M first cause values (for example, the $L^{th}$ value) |
| ... | One of the M first cause values |

(2) The terminal determines the first cause value based on a mapping relationship between the AI and the first cause value.

(3) The terminal determines the first cause value based on a mapping relationship between the AC and the first cause value.

For example, the terminal determines the first cause value based on the mapping relationship between the second cause value and the first cause value in Manner (1). The mapping relationship between the second cause value and the first cause value may be established in any one of the following manners: sending, by a core network, the mapping relationship to the terminal through an NAS signaling message, sending, by operation, administration and maintenance (OAM) configuration, the mapping relationship to the terminal, operator preconfiguration, and default configuration.

The operator preconfiguration may be, for example, writing, by an operator, configuration information to a device of the terminal in advance, or writing, by an operator, configuration information to a Universal Subscriber Identity Module (USIM) in advance. After the USIM card is inserted into the terminal, the terminal obtains the configuration information.

The default configuration may be, for example, configuration specified by a protocol. For example, the default configuration may be a mapping relationship, between the second cause value and the first cause value, specified in a 5GS NAS protocol or an E-UTRA RRC protocol.

The mapping relationship between the AI and the first cause value and the mapping relationship between the AC and the first cause value may also be established in any one of the foregoing manners, and details are not described again.

It should be also noted that, in addition to determining the first cause value based on at least one of the AI, the AC, or the second cause value, optionally, the terminal may further determine the first cause value based on the type of the access attempt.

In an implementation process, the foregoing methods for determining the first cause value may be separately implemented, or may be implemented in combination. When the methods are implemented in combination, for example, when the terminal may determine the first cause value based on both the mapping relationship between the AI and the first cause value and the mapping relationship between the AC and the first cause value, a possible implementation is that the terminal obtains a mapping relationship, that is, a mapping relationship between the AI, the AC, and the first cause value, to determine the first cause value. For the mapping relationship between the AI, the AC, and the first cause value, refer to a definition manner similar to that in Table 1, as shown in Table 3 below.

TABLE 3

| AI | AC | RRC setup cause value |
|---|---|---|
| AI 0 | AC 0 | One of the M first cause values |
|  | AC 1 | One of the M first cause values |
|  | ... | One of the M first cause values |
|  | AC Y | One of the M first cause values |
| AI 1 | AC 0 | One of the M first cause values |
|  | AC 1 | One of the M first cause values |
|  | ... | One of the M first cause values |
|  | AC Y | One of the M first cause values |
| ... | AC 0 | One of the M first cause values |
|  | AC 1 | One of the M first cause values |
|  | ... | One of the M first cause values |
|  | AC Y | One of the M first cause values |
| AI X | AC 0 | One of the M first cause values |
|  | AC 1 | One of the M first cause values |
|  | ... | One of the M first cause values |
|  | AC Y | One of the M first cause values |

Optionally, in a possible implementation, all the values of the first cause value are the same as the values of the second cause value, and there are N-M values that are in the second cause values but not in the first cause values. In this case, some mapping relationships in Table 3 are the same as the mapping relationships in Table 1. Table 3 may also include only a part different from that in Table 1. As shown in the following Table 3-1, when the second cause value obtained according to Table 1 is a value of the first cause value, Table 3-1 does not need to carry a mapping relationship between the AI, the AC, and the value of the first cause value.

TABLE 3-1

| AI | AC | RRC setup cause value |
|---|---|---|
| AI x | AC y | One of the M first cause values (the second cause value obtained according to Table 1 is not a value of the first cause value) |
|  | ... | One of the M first cause values (the second cause value obtained according to Table 1 is not a value of the first cause value) |

The following describes optional implementations of this application from perspectives of different execution bodies.

Referring to the structure of the protocol stack of the terminal shown in FIG. 3, the terminal includes a first protocol layer and a second protocol layer. The first protocol layer may be, for example, an NAS, and the second protocol layer may be, for example, an RRC layer. In other approaches, for example, a terminal accesses a 5GC through a gNB. First, a 5GS NAS of the terminal generates an NR cause value. Then, the 5GS NAS sends the NR cause value to NR RRC, and the NR RRC sends the NR cause value to the gNB.

The terminal may perform this step in the following two optional manners.

(1) The first protocol layer determines the first cause value based on the access information.

The first protocol layer may determine the first cause value in any one of the foregoing mapping manners or a combination thereof.

For example, the first protocol layer is a 5GS NAS, and the terminal determines the first cause value based on the mapping relationship between the AI, the AC, and the first cause value. An execution process of this manner is as follows.

The 5GS NAS first obtains the AI and the AC, and then the 5GS NAS obtains the first cause value based on the mapping relationship between the AI, the AC, and the first cause value.

Correspondingly, for this implementation, further, the 5GS NAS sends the first cause value to E-UTRA RRC, and the E-UTRA RRC directly sends the first cause value to an ng-eNB. That is, the second protocol layer obtains the first cause value from the first protocol layer, and then sends a first message including the first cause value.

(2) The second protocol layer determines the first cause value based on the access information.

In this manner, the second protocol layer first obtains the access information from the first protocol layer, and then determines the first cause value based on the access information.

For example, the first protocol layer sends at least one of the AI, the AC, or the second cause value of the second access technology to the second protocol layer. Optionally, the first protocol layer may further send the type of the access attempt to the second protocol layer. After receiving the information, the second protocol layer may determine the first cause value in any one of the foregoing mapping manners or a combination thereof.

For example, the first protocol layer is a 5GS NAS, and the terminal determines the first cause value based on the mapping relationship between the AI, the AC, and the first cause value. An execution process of this manner is as follows.

The 5GS NAS first obtains the AI and the AC, and then the 5GS NAS sends the AI and the AC to E-UTRA RRC. After receiving the AI and the AC, the E-UTRA RRC obtains the first cause value based on the mapping relationship between the AI, the AC, and the first cause value.

Optionally, the first protocol layer sends at least one of the AI, the AC, or the second cause value of the second access technology to the second protocol layer in the following manners.

(1) The first protocol layer determines the second cause value corresponding to the second radio access technology, and the first protocol layer sends the second cause value to the second protocol layer of the first radio access technology.

(2) If the first protocol layer determines that a Radio Access Technology (RAT) used by the terminal is the first radio access technology, the first protocol layer directly sends the AI and the AC to the second protocol layer.

(3) If the first protocol layer determines that an RAT used by the terminal is the first radio access technology, the first protocol layer determines the second cause value corresponding to the second radio access technology. When the second cause value is not a value of the first cause value of the first radio access technology, the first protocol layer directly sends the AI and the AC to the second protocol layer. If the second cause value determined by the first protocol layer is a value of the first cause value of the first radio access technology, the first protocol layer directly sends the second cause value to the second protocol layer as the first cause value of the first radio access technology. For example, the first protocol layer generates a second cause value. When the values of the first cause value include the second cause value, the first protocol layer sends the second cause value to the second protocol layer as the first cause value, such that the second protocol layer carries the second cause value in a first message. When the values of the first cause value do not include the second cause value, the first protocol layer sends the AI and the AC to the second protocol layer, such that the second protocol layer obtains the first cause value based on the AI and the AC (for example, according to the mapping relationship shown in Table 3-1).

S403: The terminal sends the first message, where the first message is used to request to establish the RRC connection, and the first message includes the first cause value.

For example, after determining the first cause value through the foregoing steps, the terminal sends the first cause value via the first message.

Optionally, the first message may be a message for establishing a new RRC connection, a message for resuming an RRC connection, or a message for reestablishing an RRC connection. The message for establishing a new RRC connection may be an RRC connection request message (RRC Connection Request), the message for resuming an RRC connection may be an RRC connection resume request message (RRC Connection Resume Request), and the message for reestablishing an RRC connection may be an RRC connection reestablishment request message (RRC Connection Reestablishment Request).

In this embodiment, the terminal may determine the first cause value based on the access information that includes at least one of the AI, the AC, or the second cause value, where the first cause value is the cause value of the first radio access technology, and the second cause value is a cause value of the second radio access technology. Therefore, when a radio access device provides, using one radio access technology for the terminal, services of a plurality of core networks using different technologies, cause values that are sent by the terminal to the radio access device and that are used for communication with different core networks may be carried in a message format defined by a same radio access technology. In this way, when the terminal accesses a plurality of core networks using one radio access technology, the terminal can successfully report a cause value. For example, when the terminal accesses an EPC through an ng-eNB, a first cause value of E-UTRA is used. When the terminal accesses a 5GC through the ng-eNB, a corresponding first radio access technology is E-UTRA, and a corresponding second radio access technology is NR. Therefore, the terminal may determine an E-UTRA cause value based on at least one of the AI, the AC, or an NR cause value. To be more specific, when accessing the 5GC, the terminal may also use the E-UTRA to report the cause value to the ng-eNB. This ensures that the terminal can successfully report the cause value when the terminal accesses the EPC and the 5GC through the ng-eNB.

In this application, an example in which the first radio access technology is E-UTRA, the second radio access technology is NR, the first protocol layer is a 5GS NAS, and the second protocol layer is E-UTRA RRC is used below to describe a complete execution process of this application.

Figure 5A:
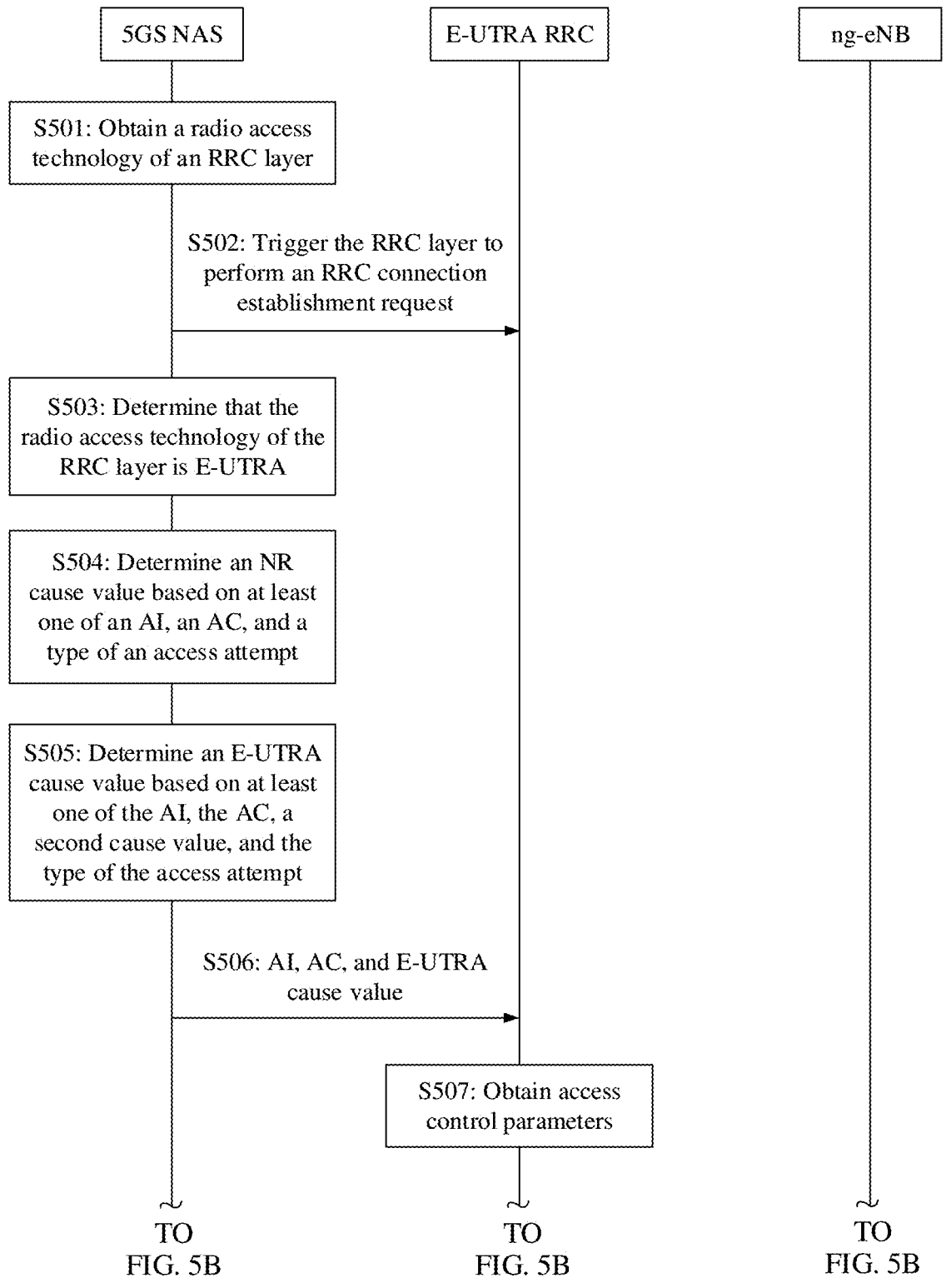
FIG. 5A and FIG. 5B are a first interaction flowchart of a communication method according to this application.
Figure 5B:
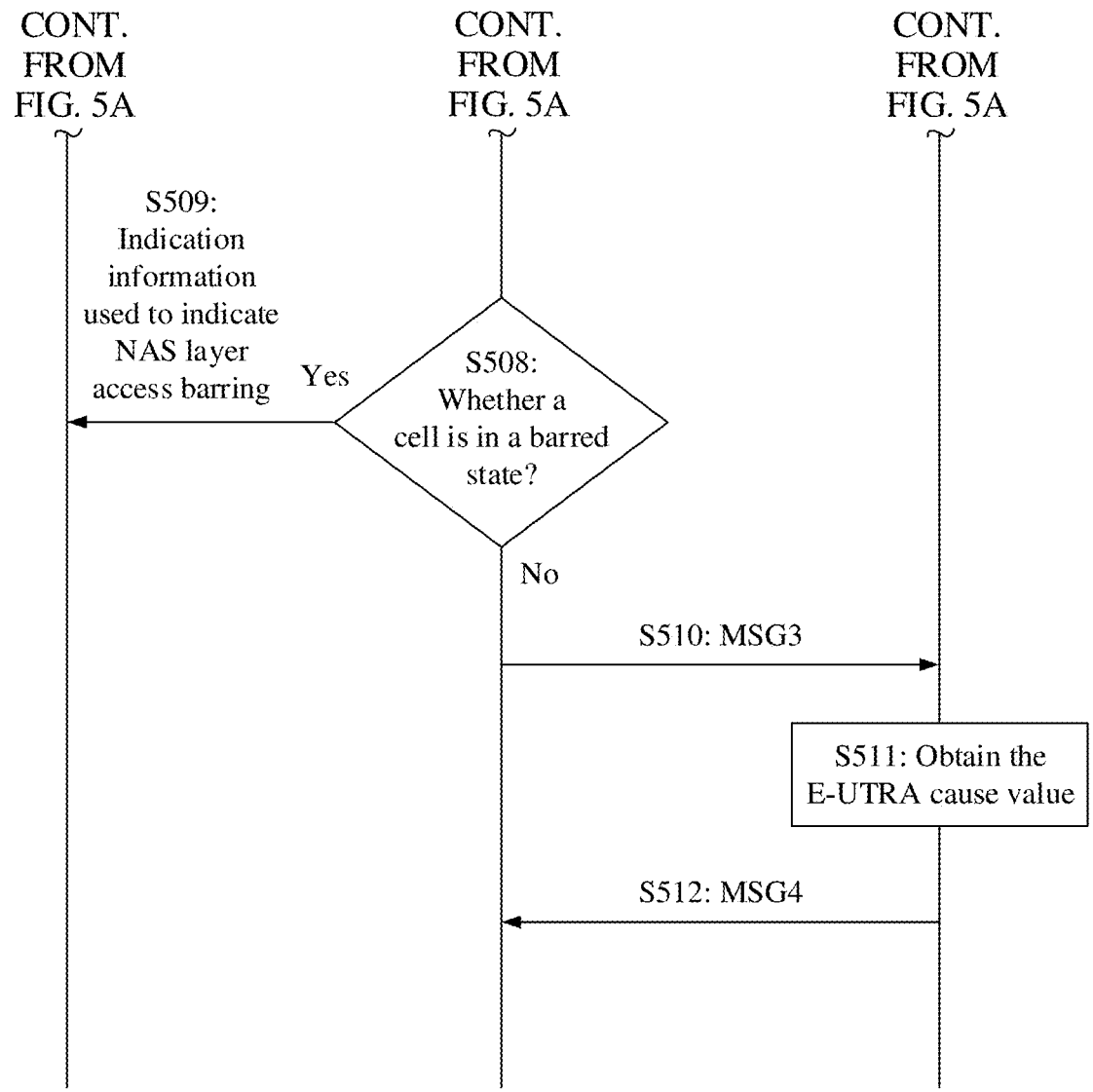

FIG. 5A and FIG. 5B are a first interaction flowchart of a communication method according to this application. As shown in FIG. 5A and FIG. 5B, a first cause value is generated by a 5GS NAS and is sent to E-UTRA RRC. An execution process is as follows.

S501: Optionally, the 5GS NAS obtains a radio access technology of an RRC layer. Before this step, a terminal has performed cell selection or cell reselection, and camps on a cell. In this case, the radio access technology of the RRC layer is a radio access technology used by the cell on which the terminal camps. For example, if the terminal camps on an E-UTRA cell, the radio access technology of the RRC layer is E-UTRA.

It should be noted that, in this case, the 5GS NAS is already in a working state, such that an RAN accessed by the terminal is an NG-RAN. The NG-RAN can provide two radio access technologies: NR and E-UTRA. Therefore, the 5GS NAS can learn that the radio access technology corresponding to the RRC layer is NR or E-UTRA. If a function of the 5GS NAS includes providing different parameters (for example, cause values) for NR RRC and E-UTRA RRC, the 5GS NAS needs to obtain whether the radio access technology of the RRC layer is NR or E-UTRA. If the 5GS NAS provides consistent services for RRC (that is, there is no need to distinguish between NR RRC and E-UTRA RRC), the 5GS NAS does not need to further obtain whether the radio access technology of the RRC layer is NR or E-UTRA.

S502: The 5GS NAS sends a request to the RRC layer, to trigger the RRC layer to establish an RRC connection.

S503: The 5GS NAS determines that the radio access technology of the RRC layer is E-UTRA.

S504: The 5GS NAS determines an NR cause value (a second cause value) based on at least one of an AI, an AC, or a type of an access attempt.

The 5GS NAS may determine the NR cause value according to the method in the embodiment shown in FIG. 4.

For example, the 5GS NAS determines the second cause value according to Table 1.

S505: The 5GS NAS determines an E-UTRA cause value (the first cause value) based on at least one of the AI, the AC, the second cause value, or the type of the access attempt.

The 5GS NAS may determine the E-UTRA cause value according to the method in the embodiment shown in FIG. 4.

For example, the 5GS NAS determines the first cause value according to Table 2, Table 2-1, Table 3, or Table 3-1. It should be noted that S504 is an optional step. For example, if the 5GS NAS determines the first cause value based only on the AI and the AC, S504 does not need to be performed.

S506: The 5GS NAS sends the AI, the AC, and the E-UTRA cause value to an E-UTRA RRC layer.

S507: The E-UTRA RRC layer reads system information of the camped cell, and obtains access control parameters in the system information.

For example, the access control parameters include an access ratio and a barring time that are related to the AC, and a bitmap related to the AI.

S508: The E-UTRA RRC layer determines, based on the AI, the AC, and the access control parameters, whether the cell is in a barred state. If the cell is in the barred state, S509 is performed. If the cell is not in the barred state, S510 is performed.

S509: The E-UTRA RRC layer sends, to the 5GS NAS, indication information used to indicate NAS layer access barring.

S510: The E-UTRA RRC layer sends an RRC message to an ng-eNB.

The RRC message is referred to as a message 3 (or Message3 (MSG3)). The MSG3 carries the E-UTRA cause value, used to indicate, to the ng-eNB, a cause of initiating connection establishment or resume by the terminal.

S511: The ng-eNB receives the MSG3 and obtains the E-UTRA cause value in the MSG3.

S512: The ng-eNB determines whether access of the terminal is allowed, and returns a message 4 (MSG4).

If the access is allowed, the MSG4 carries an RRC message indicating that the access is allowed, for example, the RRC message may be RRC connection setup or RRC connection resume.

If the access is not allowed, the MSG4 carries an RRC message indicating rejection, for example, the RRC message may be RRC connection reject or RRC connection resume reject.

Further, optionally, the ng-eNB sends the E-UTRA cause value to a network element (for example, an AMF) of a 5GC, to assist the 5GC in performing access control for the terminal.

Figure 6A:
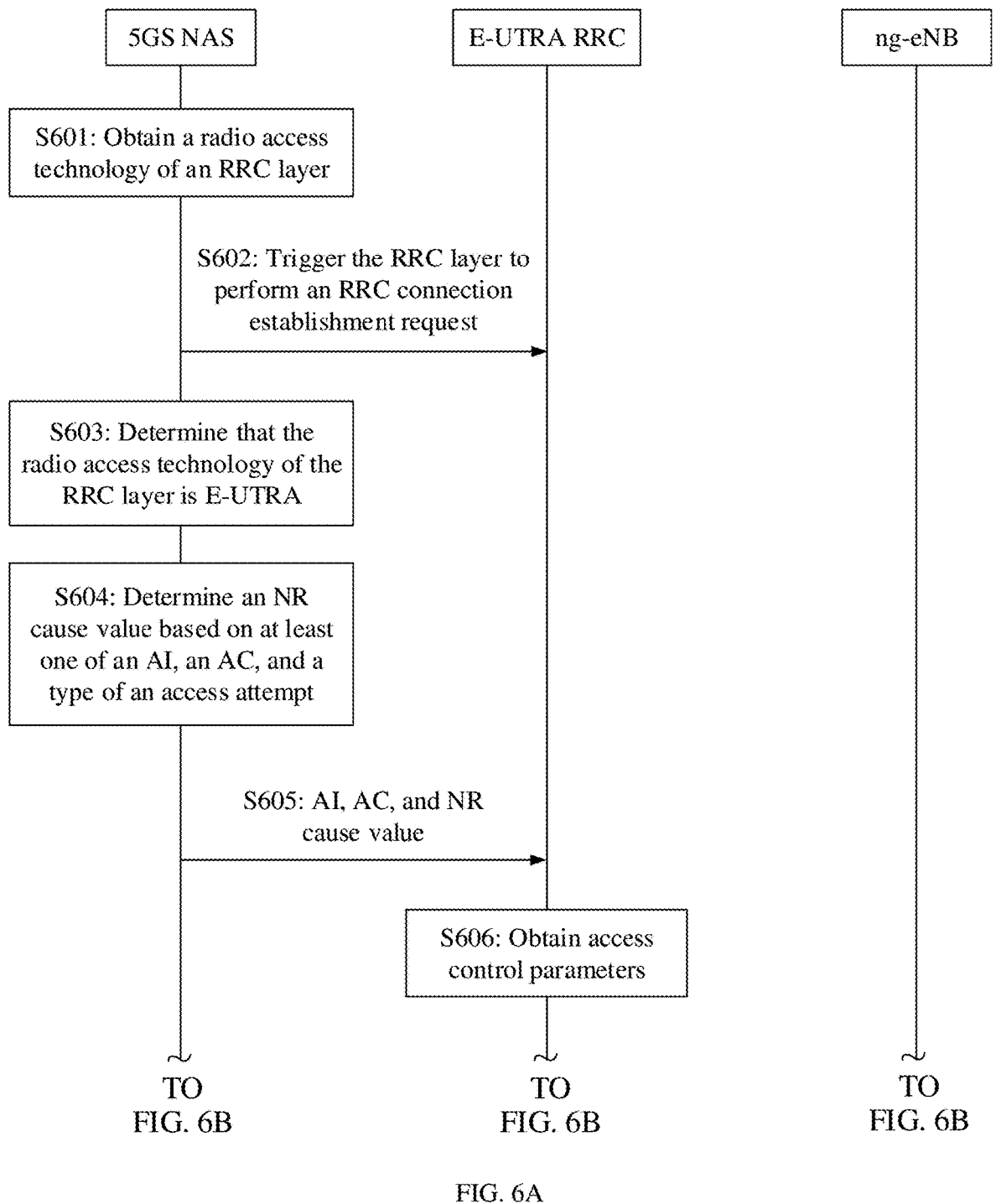
FIG. 6A and FIG. 6B are a second interaction flowchart of a communication method according to this application.
Figure 6B:
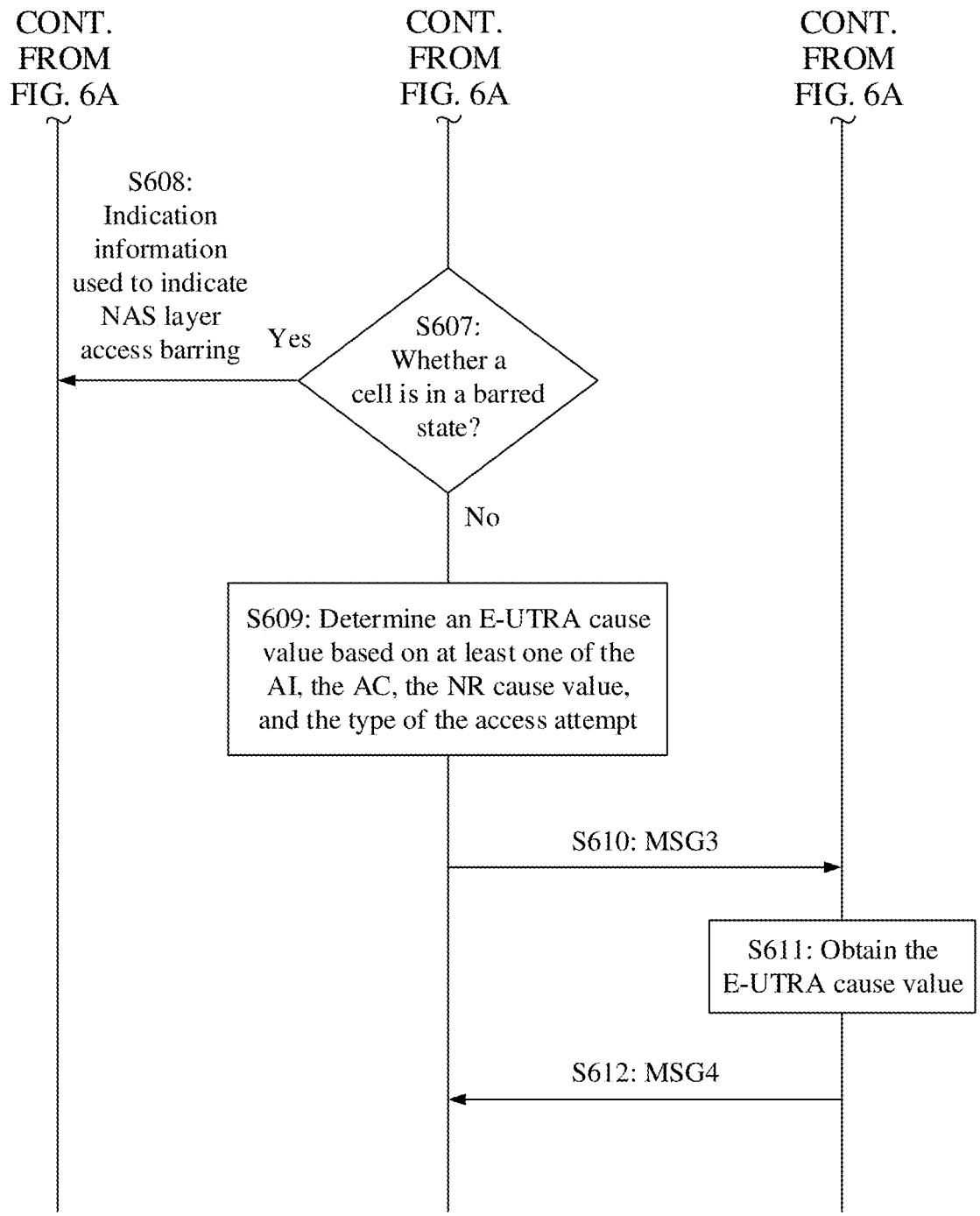

FIG. 6A and FIG. 6B are a second interaction flowchart of a communication method according to this application. As shown in FIG. 6A and FIG. 6B, a first cause value is generated by a 5GS NAS and is sent to E-UTRA RRC. An execution process is as follows.

S601: The 5GS NAS obtains a radio access technology of an RRC layer.

Before this step, a terminal has performed cell selection or cell reselection, and camps on a cell.

S602: The 5GS NAS sends an access attempt to the RRC layer, to trigger the RRC layer to perform RRC connection establishment, RRC connection resume, or RRC connection reestablishment.

S603: The 5GS NAS determines that the radio access technology of the RRC layer is E-UTRA.

S604: The 5GS NAS determines an NR cause value (a second cause value) based on at least one of an AI, an AC, or a type of the access attempt.

The 5GS NAS may determine the NR cause value according to the method in the embodiment shown in FIG. 4.

For example, the 5GS NAS determines the second cause value according to Table 1.

S605: The 5GS NAS sends the AI, the AC, and the NR cause value to an E-UTRARRC layer.

It should be noted that S604 is an optional step. For example, if the E-UTRARRC layer does not need to use the NR cause value to determine the first cause value, S504 does not need to be performed. In addition, in this step, the 5GS NAS does not need to send the NR cause value to the E-UTRA RRC layer either.

S606: The E-UTRA RRC layer reads system information of the camped cell, and obtains access control parameters in the system information.

For example, the access control parameters include an access ratio and a barring time that are related to the AC, and a bitmap related to the AI.

S607: The E-UTRA RRC layer determines, based on the AI, the AC, and the access control parameters, whether the cell is in a barred state. If the cell is in the barred state, S608 is performed. If the cell is not in the barred state, S609 and S610 are performed.

S608: The E-UTRA RRC layer sends, to the 5GS NAS, indication information used to indicate NAS layer access barring.

S609: The E-UTRA RRC layer determines an E-UTRA cause value based on at least one of the AI, the AC, the NR cause value, or the type of the access attempt. Optionally, step S609 may be performed between step S605 and step S607.

The E-UTRA RRC layer may determine the E-UTRA cause value according to the method in the embodiment shown in FIG. 4.

For example, the E-UTRA RRC determines the first cause value according to Table 2, Table 2-1, Table 3, or Table 3-1.

S610: The E-UTRA RRC layer sends an RRC message to an ng-eNB.

The RRC message is referred to as an MSG3. The MSG3 carries the E-UTRA cause value, used to indicate, to the ng-eNB, a cause of initiating RRC connection establishment or resume by the terminal.

S611: The ng-eNB receives the MSG3 and obtains the E-UTRA cause value in the MSG3.

S612: The ng-eNB determines whether access of the terminal is allowed, and returns an MSG4.

If the access is allowed, the MSG4 carries an RRC message indicating that the access is allowed, for example, the RRC message may be RRC connection setup or RRC connection resume.

If the access is not allowed, the MSG4 carries an RRC message indicating rejection, for example, the RRC message may be RRC connection reject or RRC connection resume reject.

Further, optionally, the ng-eNB sends the E-UTRA cause value to a network element (for example, an AMF) of a 5GC, to assist the 5GC in performing access control for the terminal.

To make the technical solutions in this application clearer, the following describes a process in which the terminal accesses the 5GC through a gNB.

Figure 7:
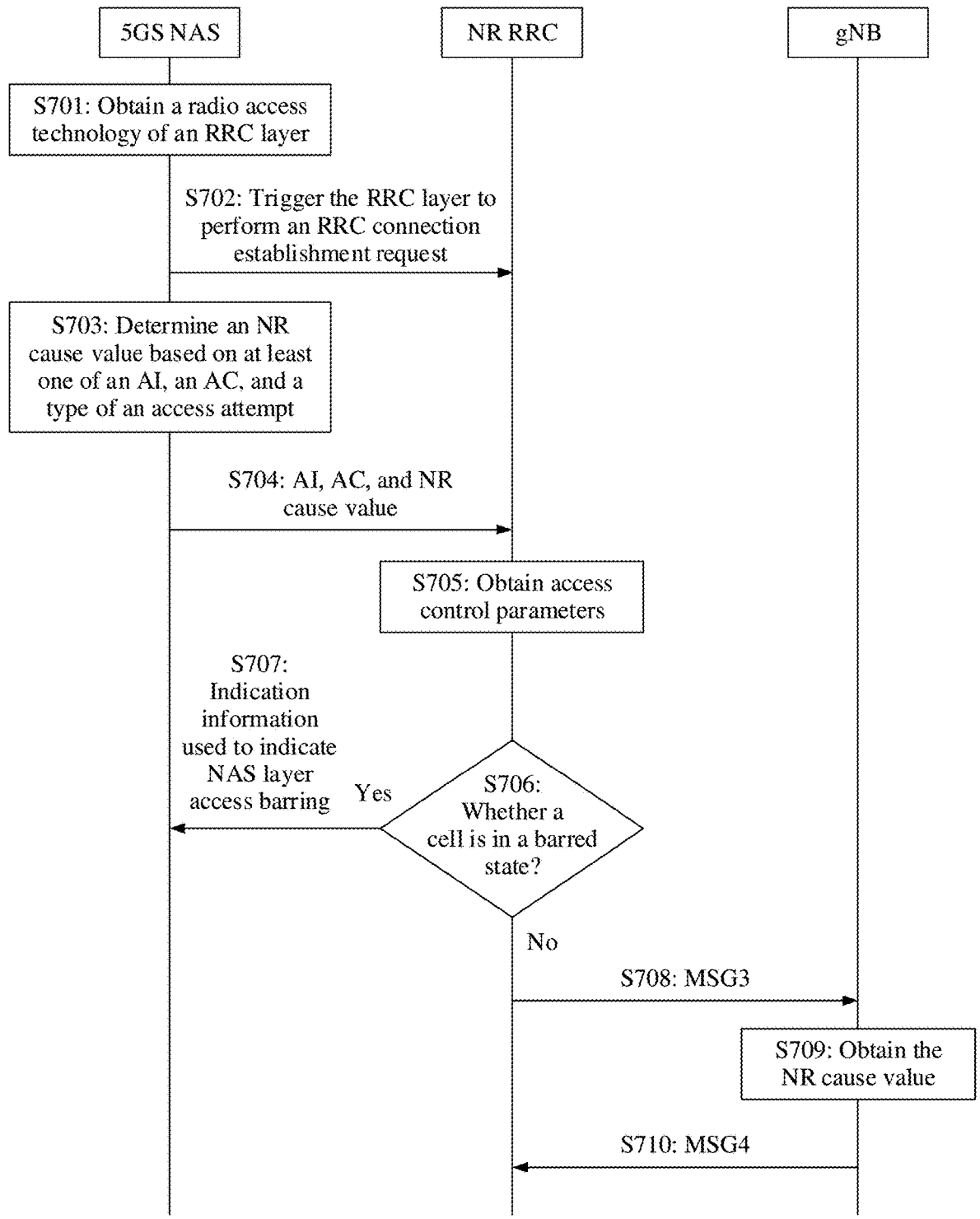
FIG. 7 is a third interaction flowchart of a communication method according to this application.

FIG. 7 is a third interaction flowchart of a communication method according to this application. As shown in FIG. 7, a process in which a terminal accesses a 5GC through a gNB is as follows.

S701: Optionally, a 5GS NAS obtains a radio access technology of an RRC layer.

Before this step, the terminal has performed cell selection or cell reselection, and camps on a cell. In this case, the radio access technology of the RRC layer is a radio access technology used by the cell on which the terminal camps. For example, if the terminal camps on an E-UTRA cell, the radio access technology of the RRC layer is E-UTRA.

It should be noted that, in this case, the 5GS NAS is already in a working state, such that an RAN accessed by the terminal is an NG-RAN. The NG-RAN can provide two radio access technologies: NR and E-UTRA. Therefore, the 5GS NAS can learn that the radio access technology corresponding to the RRC layer is NR or E-UTRA. If a function of the 5GS NAS includes providing different parameters (for example, cause values) for NR RRC and E-UTRA RRC, the 5GS NAS needs to obtain whether the radio access technology of the RRC layer is NR or E-UTRA. If the 5GS NAS provides consistent services for RRC (that is, there is no need to distinguish between NR RRC and E-UTRA RRC), the 5GS NAS does not need to further obtain whether the radio access technology of the RRC layer is NR or E-UTRA.

S702: The 5GS NAS sends a request to the RRC layer, to trigger the RRC layer to perform RRC connection establishment, RRC connection resume, or RRC connection reestablishment.

S703: The 5GS NAS determines an NR cause value based on at least one of an AI, an AC, or a type of an access attempt. For example, the 5GS NAS determines a second cause value according to Table 1.

For example, the 5GS NAS may determine the NR cause value according to the method in the embodiment shown in FIG. 4.

S704: The 5GS NAS sends the AI, the AC, and the NR cause value to an NR RRC layer.

S705: The NR RRC layer reads system information of the camped cell, and obtains access control parameters in the system information.

For example, the access control parameters include an access ratio and a barring time that are related to the AC, and a bitmap related to the AI.

S706: The NR RRC layer determines, based on the AI, the AC, and the access control parameters, whether the cell is in a barred state. If the cell is in the barred state, S707 is performed. If the cell is not in the barred state, S708 and S709 are performed.

S707: The NR RRC layer sends, to the 5GS NAS, indication information used to indicate NAS layer access barring.

S708: The NR RRC layer sends an RRC message to the gNB.

The RRC message is referred to as an MSG3. The MSG3 carries the NR cause value, used to indicate, to the gNB, a cause of initiating connection establishment or resume by the terminal.

S709: The gNB receives the MSG3 and obtains the NR cause value in the MSG3.

S710: The gNB determines whether access of the terminal is allowed, and returns an MSG4.

If the access is allowed, the MSG4 carries an RRC message indicating that the access is allowed, for example, the RRC message may be RRC connection setup or RRC connection resume.

If the access is not allowed, the MSG4 carries an RRC message indicating rejection, for example, the RRC message may be RRC connection reject or RRC connection resume reject.

Further, optionally, the gNB sends the NR cause value to a network element (for example, an AMF) of the 5GC, to assist the 5GC in performing access control for the terminal.

In an implementation process, the embodiments shown in FIG. 5A and FIG. 5B, FIG. 6A and FIG. 6B, and FIG. 7 may be separately implemented in combination with the technical solution shown in FIG. 4. For example, in the execution procedure shown in FIG. 5A and FIG. 5B, the 5GS NAS may determine the NR cause value and the E-UTRA cause value using the method shown in FIG. 4. In the execution procedure shown in FIG. 6A and FIG. 6B, the 5GS NAS may determine the NR cause value using the method shown in FIG. 4, and the E-UTR ARRC layer may determine the E-UTRA cause value using the method shown in FIG. 4. In addition, in the method shown in FIG. 4, different solutions may also be combined for implementation. For example, the 5GS NAS may determine the first cause value based only on the AI or the AC, or the 5GS NAS may determine the first cause value based on both the AI and the AC.

Figure 8:
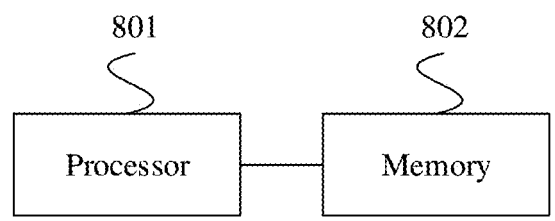
FIG. 8 is an entity block diagram of a communications apparatus according to this application.

FIG. 8 is an entity block diagram of a communications apparatus according to this application. Optionally, the communications apparatus may be a terminal device, or may be some apparatuses in a terminal device, for example, a chip system in a terminal device. Optionally, the chip system is configured to support a terminal device in implementing the functions in the foregoing method embodiments, for example, generating, receiving, sending, or processing the data and/or the information in the foregoing methods. Optionally, the chip system further includes a memory. The memory is configured to store a program instruction and data that are necessary for a terminal device. The chip system includes a chip, and may further include another discrete device or circuit structure.

As shown in FIG. 8, the communications apparatus includes a processor 801 configured to be coupled to a memory 802, and further configured to read and execute instructions in the memory 802 to implement the following: determining a first radio access technology for establishing an RRC connection; determining, based on access information, a first cause value for establishing the RRC connection, where the first cause value is a cause value of the first radio access technology, and the access information includes at least one of an AI, an AC, or a second cause value of a second radio access technology; and sending a first message, where the first message is used to request to establish the RRC connection, and the first message includes the first cause value.

Further, the processor 801 is further configured to determine the first cause value based on a mapping relationship between the second cause value and the first cause value.

Further, the processor 801 is further configured to determine the first cause value based on a mapping relationship between the AI and the first cause value.

Further, the processor 801 is further configured to determine the first cause value based on a mapping relationship between the AC and the first cause value.

Further, the processor 801 is further configured to determine, at a first protocol layer, the first cause value based on the access information.

Further, the processor 801 is further configured to: obtain, at a second protocol layer, the first cause value from the first protocol layer; and send, at the second protocol layer, the first message including the first cause value.

Further, the processor 801 is further configured to: obtain, at a second protocol layer, the access information from a first protocol layer; and determine, at the second protocol layer, the first cause value based on the access information.

Further, the first radio access technology includes an E-UTRA technology, and the second radio access technology includes an NR technology.

Further, the first protocol layer is an NAS, and the second protocol layer is an RRC layer.

Figure 9:
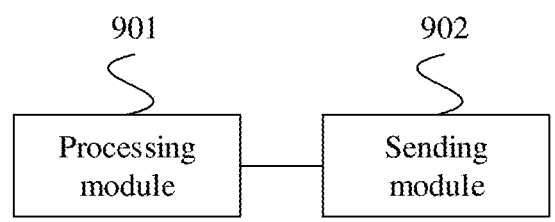
FIG. 9 is a structural diagram of modules of a communications apparatus according to this application.

FIG. 9 is a structural diagram of modules of a communications apparatus according to this application. As shown in FIG. 9, the apparatus includes a processing module 901 configured to determine a first radio access technology for establishing an RRC connection, and determine, based on access information, a first cause value for establishing the RRC connection, where the first cause value is a cause value of the first radio access technology, and the access information includes at least one of an AI, an AC, or a second cause value of a second radio access technology; and a sending module 902 configured to send a first message, where the first message is used to request to establish the RRC connection, and the first message includes the first cause value.

Further, the processing module 901 is further configured to determine the first cause value based on a mapping relationship between the second cause value and the first cause value.

Further, the processing module 901 is further configured to determine the first cause value based on a mapping relationship between the AI and the first cause value.

Further, the processing module 901 is further configured to determine the first cause value based on a mapping relationship between the AC and the first cause value.

Further, the processing module 901 is further configured to determine, at a first protocol layer, the first cause value based on the access information.

Further, the processing module 901 is further configured to: obtain, at a second protocol layer, the first cause value from the first protocol layer; and send, at the second protocol layer, the first message including the first cause value.

Further, the processing module 901 is further configured to: obtain, at a second protocol layer, the access information from a first protocol layer; and determine, at the second protocol layer, the first cause value based on the access information.

Further, the first radio access technology includes an E-UTRA technology, and the second radio access technology includes an NR technology.

Further, the first protocol layer is an NAS, and the second protocol layer is an RRC layer.

Optionally, the communications apparatus may further include a transceiver configured to support the communications apparatus in sending and receiving data, signaling, or information in the foregoing method embodiments, for example, sending the first message.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory, a compact disc read-only memory (CD-ROM), an optical memory, and the like) that include computer usable program code.

This application is described with reference to the flowcharts and/or block diagrams of the method, the apparatus (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus configured to implement a specified function in one or more processes in the flowcharts and/or in one or more blocks in the block diagrams.

These computer program instructions may also be stored in a computer-readable memory that can instruct the computer or any other programmable data processing device to work in a specific manner, such that the instructions stored in the computer-readable memory generate an artifact that includes instructions apparatus. The instruction apparatus implements a specified function in one or more processes in the flowcharts and/or in one or more blocks in the block diagrams.

These computer program instructions may be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specified function in one or more processes in the flowcharts and/or in one or more blocks in the block diagrams.

Although some embodiments of this application have been described, a person skilled in the art can make changes and modifications to these embodiments in accordance with the concepts disclosed herein. Therefore, the following claims are intended to be construed as to cover the preferred embodiments and all changes and modifications falling within the scope of this application.

A person skilled in the art can make various modifications and variations to this application without departing from the spirit and scope of this application. This application is intended to cover these modifications and variations of this application provided that they fall within the scope of the following claims of this application and their equivalent technologies.

What is claimed is:

1. A communication method, comprising:
   determining, by a terminal, a first radio access technology for establishing a Radio Resource Control (RRC) connection;
   determining, by the terminal at a first protocol layer, a first cause value for establishing the RRC connection based on access information, wherein the first cause value is of the first radio access technology, and wherein the access information comprises an access identity (AI) and an access category (AC);
   obtaining, by the terminal at a second protocol layer, the first cause value from the first protocol layer; and
   sending, by the terminal at the second protocol layer, a first message, wherein the first message requests establishing the RRC connection with the radio access network device, and wherein the first message comprises the first cause value.

2. The communication method according to claim 1, wherein the first protocol layer and the second protocol layer comprise separate layers in a protocol stack of the terminal.

3. The communication method of claim 1, wherein determining, by the terminal based on the access information, the first cause value comprises determining, by the terminal, the first cause value based on a mapping relationship between one of the AC or the AI and the first cause value.

4. The communication method of claim 1, wherein the access information comprises a second cause value of a second radio access technology.

5. The communication method of claim 1, further comprising detecting, by one of the first protocol layer or the second protocol layer of the terminal, an access attempt triggered by the terminal.

6. The communication method of claim 5, further comprising obtaining, by the terminal, the access information in response to detecting the access attempt.

7. The communication method of claim 1, wherein the first radio access technology comprises an evolved universal terrestrial radio access (E-UTRA) technology or a new radio (NR) technology.

8. The communication method of claim 1, wherein the first protocol layer is a non-access stratum (NAS) for a $5^{th}$ generation (5G) system, and wherein the second protocol layer is an RRC layer.

9. The communication method of claim 3, wherein the mapping relationship is preset according to a default configuration.

10. The communication method of claim 1, wherein establishing the RRC connection comprises establishing a new RRC connection with a radio access network device to which the first message is sent.

11. A communications apparatus, comprising:
a memory configured to store instructions; and
a processor coupled to the memory and configured to execute the instructions to enable the communications apparatus to:
determine a first radio access technology for establishing a Radio Resource Control (RRC) connection;
determine, at a first protocol layer, a first cause value for establishing the RRC connection based on access information, wherein the first cause value is of the first radio access technology, and wherein the access information comprises an access identity (AI) and an access category (AC);
obtain, at a second protocol layer, the first cause value from the first protocol layer; and
send, at the second protocol layer, a first message, wherein the first message requests establishing the RRC connection, and wherein the first message comprises the first cause value.

12. The communications apparatus of claim 11, wherein the access information further comprises a second cause value of a second radio access technology different from the first radio access technology.

13. The communications apparatus of claim 11, wherein the processor is further configured to execute the instructions to enable the communications apparatus to determine the first cause value based on a mapping relationship between the AI and the first cause value.

14. The communications apparatus of claim 11, wherein the processor is further configured to execute the instructions to enable the communications apparatus to determine the first cause value based on a mapping relationship between the AC and the first cause value.

15. The communications apparatus of to claim 11, wherein the processor is further configured to execute the instructions to enable the communications apparatus to establish the RRC connection with a radio access network device configured to use the first radio access technology, and wherein the radio access network device is connected to multiple core networks configured to use different radio access technologies than the first radio access technology.

16. The communications apparatus of claim 15, wherein the processor is further configured to execute the instructions to enable the communications apparatus to access one or more of the multiple core networks using the first radio access technology of the radio access network device.

17. The communications apparatus of claim 11, wherein the first radio access technology comprises an evolved universal terrestrial radio access (E-UTRA) technology or a new radio (NR) technology.

18. The communications apparatus of claim 11, further comprising a protocol stack including the first protocol layer and the second protocol layer, wherein the first protocol layer is a non-access stratum (NAS) for a $5^{th}$ generation (5G) system, and wherein the second protocol layer is an RRC layer.

19. The communications apparatus of claim 13, wherein the mapping relationship is preset according to a default configuration.

20. The communications apparatus of claim 11, wherein establishing the RRC connection comprises establishing a new RRC connection.

21. The communication method of claim 1, wherein the first radio access technology is an evolved universal terrestrial radio access (E-UTRA) technology, the first protocol layer is a $5^{th}$ generation (5G) non-access stratum (NAS) layer, and the second protocol layer is an E-UTRA RRC layer.

22. The communications apparatus of claim 11, wherein the first radio access technology is an evolved universal terrestrial radio access (E-UTRA) technology, the first protocol layer is a $5^{th}$ generation (5G) non-access stratum (NAS) layer, and the second protocol layer is an E-UTRA RRC layer.

* * * * *